United States Patent [19]

Vanderbilt

[11] Patent Number: 5,075,386
[45] Date of Patent: Dec. 24, 1991

[54] CROSS-LINKABLE HOT-MELT ADHESIVE AND METHOD OF PRODUCING SAME

[75] Inventor: Jeffrey J. Vanderbilt, Longview, Tex.

[73] Assignee: Eastman Kodak Company, Rochester, N.Y.

[21] Appl. No.: 508,374

[22] Filed: Apr. 12, 1990

[51] Int. Cl.$^5$ .................. C08L 23/14; C08L 23/06; C08L 51/06; C08L 63/00
[52] U.S. Cl. ................... 525/327.3; 428/355; 525/65; 525/74; 525/327.4; 528/95; 528/355
[58] Field of Search ............ 525/65, 74, 327.3, 327.4; 528/95; 428/355

[56] References Cited

U.S. PATENT DOCUMENTS

| | | | |
|---|---|---|---|
| 3,454,436 | 7/1969 | Bedell | 528/95 |
| 3,701,760 | 10/1972 | Hagemeyer et al. | 525/338 |
| 3,784,396 | 1/1974 | Fourment et al. | 427/195 |
| 3,856,889 | 12/1974 | McConnell | 428/513 |
| 4,052,527 | 10/1977 | Pastor et al. | 428/463 |
| 4,091,195 | 5/1978 | Vitek | 428/456 |
| 4,207,220 | 6/1980 | Godfrey | 428/440 |
| 4,259,470 | 3/1981 | Trotter et al. | 428/355 |
| 4,354,012 | 10/1982 | Scola | 526/259 |
| 4,396,675 | 8/1983 | Groff | 428/355 |
| 4,552,794 | 11/1985 | Goss | 428/95 |
| 4,567,223 | 1/1986 | Ames | 525/74 |
| 4,600,648 | 7/1986 | Yazaki et al. | 428/412 |
| 4,612,349 | 9/1986 | Nicco et al. | 525/117 |
| 4,668,736 | 5/1987 | Robins et al. | 525/65 |
| 4,784,396 | 11/1988 | Scott et al. | 277/166 |

OTHER PUBLICATIONS

I. J. Davis, "Curing Hot Melts", 1988 TAPPI Hot-Melt Symposium *Chemical Abstracts,* 100, 104678b (1983) *Chemical Abstracts,* 98, 17524r (1981).

*Primary Examiner*—John Kight, III
*Assistant Examiner*—T. Mosley
*Attorney, Agent, or Firm*—Mark A. Montgomery; Willliam P. Heath, Jr.

[57] ABSTRACT

A cross-linkable hot-melt adhesive is prepared by mixing an acid graft modified propylene/olefin copolymer with an epoxy cross-linking agent and a tertiary amine catalyst. The adhesive is cross-linked at an elevated temperature such as when melt mixing the components.

15 Claims, No Drawings

CROSS-LINKABLE HOT-MELT ADHESIVE AND METHOD OF PRODUCING SAME

This invention relates to hot-melt adhesives that are cross-linkable and to the method of producing and using these cross-linkable hot-melt adhesives.

BACKGROUND OF THE INVENTION

Hot-melt adhesives are known and have been used in industry for various applications such as product assembly. Examples of such applications are in the packaging industry in the fabrication of corrugated paperboard, cardboard case sealing and carton closing operations. The adhesive is generally applied by a hot-melt applicator which consists of a heated reservoir for maintaining the adhesive in a molten state, and a means for applying the adhesive to a substrate.

Hot-melt adhesives usually have relatively low cohesive strength and poor elevated temperature properties. Hot-melt adhesives are generally amorphous polyolefins, such as amorphous polypropylene, and the cohesive strength of amorphous materials is relatively low. By definition hot-melt adhesives must melt at the applicator temperature and therefore do not enjoy good elevated temperature properties.

Cross-linking of the hot-melt adhesive once it is applied to a substrate would improve both the elevated temperature properties and adhesive strength. Cross-linking can be affected by generally four types of mechanisms or methods: high-energy activation (i.e., ultraviolet light), moisture activation, heat activation, and oxygen induced coupling (i.e., drying oils). Examples of these methods are disclosed in Curing Hot Melts, I. J. Davis, 1988 TAPPI Hot-Melt Symposium and U.S. Pat. No. 4,052,527.

There are several problems presented by cross-linking hot-melt adhesives using the above methods. The majority of these methods are slow or unpredictable and require the adhesive to be open to exposure such as by ultraviolet light, moisture, or air and therefore, the adhesive could not be between two substrates. Additionally, due to the type of substrate upon which the hot-melt adhesive is applied, certain cross-linking treatments are not desirable. For example, some substrates are sensitive to treatments such as ultraviolet light treatment or moisture treatment. It would, therefore, be very desirable to obtain a hot-melt adhesive that has improved elevated temperature properties and cohesive strength while avoiding the above problems.

SUMMARY OF THE INVENTION

The present invention is directed to unique cross-linkable hot-melt adhesive compositions These cross-linkable hot-melt adhesives, after application, have improved cohesive strength and elevated temperature properties. According to the present invention, cross-linkable hot-melt adhesives are prepared by mixing an acid graft modified propylene/olefin copolymer with an epoxy cross-linking agent and a tertiary amine catalyst, wherein the epoxy cross-linking agent is of the formula:

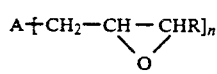

in which n is between 2 and 6 inclusive, A is a polyfunctional group of the valency n and R is a hydrocarbon radical.

The cross-linkable hot-melt adhesive is prepared and cross-linked by mixing the acid graft modified propylene/olefin copolymer with the epoxy cross-linking agent and the tertiary amine catalyst and heating the mixture to a sufficient temperature for a sufficient time to crosslink the adhesive.

DETAILED DESCRIPTION OF THE INVENTION

The cross-linkable hot-melt adhesive comprises:
(a) about 50 to 99% by weight, based on the total composition of at least one acid graft modified propylene/olefin copolymer containing about 70 to 95 mole percent propylene;
(b) up to 50% by weight of at least one tackifying resin;
(c) about 1 to 20 parts by weight per 100 parts by weight of (a) of an epoxy cross-linking agent of the formula;

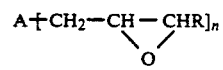

in which n is between 2 and 6 inclusive, A is a polyfunctional group of the valency n, and R is a hydrocarbon radical;
(d) about 0.05 to 10% by weight of at least one antioxidant; and
(e) about 0.1 to about 10% by weight based on (c) plus (e) of a tertiary amine catalyst.

The acid graft modified propylene/olefin copolymers used in the present invention are much more reactive than copolymers in which the acid-bearing modifier is copolymerized into the backbone. The acid graft modified propylene/olefin copolymers are made by mixing a propylene/olefin copolymer with an unsaturated carboxylic acid, anhydride, or monoester thereof under conditions of temperature and pressure to graft the acid, anhydride, or monoester onto the propylene/olefin copolymer. The acid graft modified propylene/olefin copolymer is preferably prepared from propylene and a higher olefin such as an alpha olefin of 4 to 10 carbon atoms with the olefin hexene being most preferred.

The propylene/olefin copolymer preferably has a melt viscosity between 1,000 and 15,000 centipoise (cP) at 177° C. The preferred propylene/olefin copolymers include low molecular weight or degraded propylene/higher olefin copolymers.

Examples of suitable acid graft modified propylene/olefin copolymers and the preparation thereof are disclosed in U.S. Pat. Nos. 4,567,223 and 3,856,889. The disclosures of which are incorporated in their entirety herein by reference. The preparation of the acid graft modified propylene/olefin copolymer is essentially achieved by reacting the propylene/olefin polymer with an unsaturated carboxylic acid, anhydride, or mono ester thereof.

The preferred unsaturated carboxylic acids, esters or anhydrides thereof are selected from the group consisting of: acrylic acid and esters thereof; fumaric acid and esters thereof; maleic acid, esters and anhydrides thereof with maleic anhydride being most preferred.

The acid graft modified propylene/olefin copolymer preferably has an acid number between 5 and 20. The most preferred acid graft modified propylene/olefin copolymer is maleated amorphous propylene/hexene copolymer (MAPH).

The modified propylene/olefin copolymer in (a) above can be used alone or blended with at least one unmodified propylene/olefin copolymer. The acid graft modified propylene/olefin copolymer or blends of such copolymers are preferably present in an amount between about 50 and 70% by weight of the total composition more preferably 55 to 65% by weight with about 60% by weight being most preferred.

The tackifying resin used in the cross-linkable hot-melt adhesive of the present invention is preferably selected from at least one of the groups consisting of hydrocarbon resins, synthetic polyterpenes, and rosin esters. The tackifying resin preferably has a ring and ball softening point of about 95° C. to 135° C. Suitable resins and rosin esters are the terpene polymers having the suitable ring and ball softening point such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing a mixture of sulphate terpene, and at least 20% of at least one other terpene selected from the group consisting of pinene, limonene or dipentene.

The more preferred tackifying resins are selected from hydrocarbon resins such as disclosed in U.S. Pat. No. 3,701,760 the disclosure of which is incorporated in its entirety herein by reference. These hydrocarbon resins preferably have a ring and ball softening point of about 125° to 130° C., an acid number of about 0 to 2, an acid value of less than about 1 and an iodine value of 75 to 100. These hydrocarbon tackifying resins can be prepared by the polymerization of monomers consisting primarily of olefins and diolefins and include, for example, the residual by-product monomers resulting from the manufacture of isoprene.

The concentration of tackifying resin used in the adhesive of the present invention is up to 50% by weight, based on a total composition, preferably between about 20 and 35% by weight of the total adhesive composition with between about 25 and 30% by weight being more preferred.

The cross-linkable hot-melt adhesive of the present invention is preferably prepared using between about 1 and 10 parts per 100 parts of (a) above, acid graft modified propylene/olefin copolymer, of at least one epoxy of the formula;

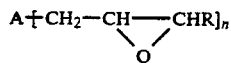

in which n is 2, 3, or 4, A is a polyhydroxide group, and R is hydrogen or a hydrocarbon radical.

The preferred amount of epoxy used in the preparation of the composition of the present invention is such that the equivalent ratio, $$\frac{\text{Epoxide equivalents in the Polyepoxide}}{\text{Anhydride equivalents in the Polymer}}$$

is between about 0.1 and 1. This equivalent ratio is more preferably between about 0.1 and 0.2. The preferred epoxy's are selected from polyglycidyl ethers of polyhydroxy compounds more preferably diglycidyl ethers of diols with Bisphenol-A diglycidyl ether (I) being most preferred.

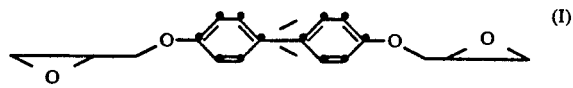

The concentration of the tertiary amine catalyst in the cross-linkable hot-melt adhesive composition according to the present invention is preferably between about 0.1 and 10% based on the weight total of epoxy and catalyst.

The tertiary amine catalyst is preferably selected from the group consisting of triethyl amine, tributyl amine, dimethylaniline, diazabicyclo[2.2.2]octane.

The hot-melt adhesive according to the present invention is cross-linked by heating the mixture to a sufficient temperature for a sufficient time to substantially cross-link the acid graft modified propylene/olefin copolymer with the epoxy in the presence of the catalyst. The cross-linking takes place in the presence of the catalyst by the reaction between the anhydride and free carboxylic acid groups on the polymer with the epoxy compound. The cross-linking is generally carried out at a temperature of at least 150° C. for at least about 5 minutes more preferably at a temperature between about 150° C. and 160° C. This cross-linking is preferably carried out at least partially in the hot-melt applicator while mixing the components together at an elevated temperature and then the hot-melt adhesive is applied to a substrate.

The components of the present invention i.e., copolymer, resin, epoxy, and catalyst should be brought to a melting point at a viscosity such that stirring is possible in order to prepare a homogeneous composition. In order to melt a majority of the composition which is mostly copolymer the temperature is generally greater than 150° C. At this temperature, the component react and cross-link within minutes. Such a catalyst system would be useful with production equipment in which two separate feed streams are premixed just prior to application to the substrate. Thus, crosslinking commences prior to application and finishes after being applied to the substrate. However, with less sophisticated equipment this catalyst system would present some problems. For example, hot-melt operations in which the adhesive composition is melted in a large pot, would be difficult with this catalyst system since rapid crosslinking would cause the composition to solidify in the pot. It is therefor preferred that the catalyst of the present invention be a latent tertiary amine catalyst. I have discovered that certain amine salts of the general formula R'3 NX can be melt blended with the other components of the hot-melt adhesive of the present invention above a temperature of 150° C. These latent amines function by producing a tertiary amine at higher temperatures. Thus, a mixture containing the latent amine catalyst can be prepared at a temperature between about 150° and 160° C., applied between two substrates, and cross-linked by heating at a higher temperature such as about 190° C. thereby generating the adhesive bond.

The latent tertiary amine catalyst produces a tertiary amine at higher temperatures by the following reaction

$$R'_3NX \rightleftharpoons R'_3N + X$$

R' is a hydrocarbon radical having 1 to 30 carbon atoms and X is a moiety that is thermally labile in its combination with R'$_3$N. For example X can be an acid, such as, picric acid. Alternatively, X can be an alkyl iodide such as, methyl iodide, ethyl iodide, and the like. The more preferred catalyst is n-methyl morpholine picrate.

The cross-linkable hot-melt adhesive mixture containing the latent tertiary amine catalyst enjoys improved pot life in comparison with mixtures containing tertiary amines.

Antioxidants can also be added to the adhesive composition of the present invention. Examples of effective antioxidants include, tris(di-t-butyl-p-hydroxybenzyl)-trimethylbenzene (available as Ionox 330 from Shell Chemical), alkylated bisphenol (available as Naugawhite from Uniroyal), zinc dibutyl dithiocarbamate (available as Butyl Zimate from R. T. Vanderbilt), and 4,4'-methylene bis(2,6-di-tert-butylphenol) (Ethyl 702), tetrakis[methylene(3,5-di-tert-butyl-4-hydroxyhydroinnamate)methane] (available as Irganox 1010 from Ciba Geigy), lauryl stearyl thiodipropionate (Plastanox 1212), and dilauryl 3,3'-thiodipropionate (Plastanox LTDP), and 2,6-di-tert-butyl-p-cresol (BHT).

The mixture of acid graft modified propylene/olefin copolymer, epoxy cross-linking agent, and tertiary amine catalyst is heated to cause cross-linking forming crosslinked hot-melt adhesive. This cross-linked hot-melt adhesive adheres two substrates together and has improved elevated temperature properties and cohesive strength. When the mixture is first heated the initial reaction is that between the epoxy and the carboxylic acid functionality present on the copolymer chain. This is illustrated in the following Example 4 in which a moderate viscosity increase of 4,000 cP to 6,300 cP was observed and the acid number decreased from 22.5 to 13.2. Infrared analysis demonstrated the loss of carboxylic acid functionality. The next reaction is the anhydride reaction with epoxy. This reaction requires a catalyst. This reaction is illustrated in the following Example 3 in which the reaction mass became intractable after just 10 minutes.

EXAMPLES

The following test procedures were used to determine the properties.

Melt viscosities of the adhesive base copolymers, high density, low viscosity waxes and the hot-melt adhesive blends were determined on a Brookfield Model RTV Thermosel Viscometer using a Number 27 spindle.

Test specimens for determining elevated temperature peel and elevated temperature shear strengths were prepared as follows. An adhesive strip ⅜ inch wide and 2 to 4 mils in thickness was applied to a strip of 30-pound Kraft paper 1 inch wide by 4 inches long. The adhesive was applied across the width of the paper on the unglazed surface. A second piece of Kraft paper of the same dimensions was placed over the first piece in either a peel or shear type bond arrangement with the unglazed surface down. The two strips were bonded on a Sentinel Model 12AS sealer using 25 psi pressure and a dwell time of 0.2 second. The upper and lower bars of the sealer were adjusted in temperature until slight bleed through of the adhesive through the paper was observed. The samples were cured by placing in an oven for a specified time.

Elevated temperature peel and elevated temperature shear were determined by attaching 100-gram weights to the bonded specimens and placing those specimens in a programmable forced-draft oven. The temperature program was set so the specimens remained at a given temperature for 10 minutes for conditioning. The temperature then was increased 4° C. and was held at this higher value for 10 minutes. The cycle was repeated over the desired temperature interval for testing. Each peel and shear specimen was prepared and tested in triplicate. Elevated temperature peel was the average value where the bond failed for the three specimens minus 2° C. Elevated temperature shear is determined in a similar manner.

Acid number, expressed as milligrams of potassium hydroxide required to neutralize one gram of sample, was determined in hot toluene using phenolphthalein as indicator.

Samples were compression molded into tensile bars at 160° C., held in the sample press for 15 minutes, and tested for tensile strength using standard procedures according to ASTM Method D638.

EXAMPLE 1

Preparation of N-Methylmorpholino Picrate

A 100-mL round-bottomed flask was charged with 3.3 grams of 65 percent aqueous picric acid (9.4 mmol) and 40 mL of methanol. The homogeneous yellow solution was cooled to 0° C., and 0.95 gram (94 mmol) of N-methylmorpholine was added. Precipitation was immediate. The mixture was stirred 30 minutes at 0° C., filtered, and the solid was washed with 20 mL of cold methanol to give after air drying 2.7 grams (3.1 is the theoretical yield) of yellow needles, melting point=228° C. to 229° C. with decomposition.

EXAMPLE 2

Preparation of Cross-linkable Maleated Amorphous Propylene-Hexene using "Latent" Amine Catalyst A 2-liter resin pot was fitted with a nitrogen bubbler and a metal anchor stirrer. The pot was charged with 353 grams (138 meq) of MAPH (11.5% hexene, viscosity of 3,900 cP at 190° C., and acid number of 22.5), 100 grams of ground Eastotac 130 (a hydrocarbon tackifier from Eastman Chemical Company), and 3.0 grams of Irganox 1010 (an antioxidant from Ciba-Geigy). Infrared spectroscopy showed bands at 1,859 and 1,782 cm$^{-1}$ indicative of anhydride functionality and a band at 1,713 cm$^{-1}$ indicative of carboxylic acid functionality. The mixture was heated with a thermostatically controlled silicone oil bath to 155° C. to 160° C. and stirred for about 3 hours to melt. To the melt was added 6.0 grams (27 meq) of Epon 828 (a bis epoxy compound from Shell Chemical). The mixture was then stirred for 1 hour. To the thick mixture was added 10 mL of an acetone solution of N-methylmorpholino picrate (0.5 gram) over 5 minutes. The mixture was stirred for 30 minutes and removed from the pot to give a yellow viscous somewhat elastic mass; acid number was 15. Infrared spectroscopy showed absorbance at 1,859, 1,782, and 1,739 cm$^{-1}$ (indicative of ester). The material became thick but was stirrable.

A portion of the above mixture was stirred for 4 hours at 160° C. and the viscosity increased from 92,500 cP to 175,250 cP at 160° C.

Another portion of the above mixture was stirred at 190° C. and the viscosity increased slowly from 19,400 cP to 292,000 cP after 24 hours at 190° C.

EXAMPLE 3

Preparation of Cross-linkable Maleated Amorphous Using Tertiary Amine Catalyst

The same components described in Example 2, except N-methylmorpholine was substituted for N-methylmorpholino picrate, were blended. After addition of the catalyst, the mixture became intractable within 10 minutes. Viscosity was too high to measure.

EXAMPLE 4

Preparation of Blend Without Catalyst

The same components described in Example 2, except no catalyst was used, were blended at 150° C. to 160° C. for 25 hours. Viscosity increased from 4,000 cP to 6,300 cP at 190° C. Acid number decreased from 22.5 to 13.2. IR showed the absence of the peak at 1,713 cm$^{-1}$ Anhydride bands at 1,859 and 1,782 cm$^{-1}$ were present. Under these conditions it appears that free acid present in the MAPH reacted with the epoxy, but the anhydride reacted very slowly.

Elevated temperature peel values were determined for the compositions described in Example 2 and 4. The composition described in Example 2 was cured under a variety of conditions. Results are presented in Table I.

TABLE I

| Elevated Temperature Peel Values for Cross-linkable Hot-Melt Adhesives | | | |
|---|---|---|---|
| Composition | Cure Temp. °C. | Cure Time Hour | Elevated Temp. Peel, °F. |
| Example 4 | | | 159 |
| Example 2 | 160 | 4.5 | 185 |
| Example 2 | 160 | 2.0 | 190 |
| Example 2 | 160 | 1.0 | 190 |
| Example 2 | 140 | 1.0 | 176 |
| Example 2 | 140 | 2.0 | 197 |
| Example 2 | 140 | 4.5 | 197 |
| Example 2 | 110 | 22.0 | 183 |
| Example 2 | 110/130 | 24/1 | 203 |
| Example 2 | 110/130 | 24/3 | 187 |
| Example 2 | 140 | 8.0 | 192 |

Elevated temperature shear values were 41° F. higher for cross-linkable hot-melt adhesive system than the control.

Thus, it is readily apparent that the cross-linkable formulations (Example 2) enjoy improved elevated temperature properties in both the peel and shear mode than the control sample (Example 4).

The compositions described in Examples 2 and 4 were subjected to tensile testing after additional curing at 160° C. Results are shown in Table II.

TABLE II

| Tensile Testing of Hot-Melt Formulations | | |
|---|---|---|
| Composition | Tensile, psi | Elongation, % |
| Example 2 | 840 | 625 |
| Example 4 | 378 | 200 |

Thus, it can be seen that the cross-linkable composition (Example 2) enjoys greater tensile strength and higher elongation.

EXAMPLE 5

(Comparative) Preparation of a Blend Using a Copolymer Containing Acid Functionality The purpose of this example was to illustrate the difference between the acid graft modified copolymer used in the present invention and a copolymer that has the acid component incorporated into the backbone of the polymer chain instead of grafted onto the polymer chain.

The same components described in Example 2, except ethylene-vinyl acetate-maleic anhydride (EVAMA) terpolymer was substituted for MAPH, were blended. The EVAMA terpolymer, prepared according to conditions described in the literature, had viscosity equal to 4,330 cP at 190° C., acid number equal to 10.3. Infrared analysis showed bands at 1,783 and 1,739 cm$^{-1}$. The composition, which was stirred at 190° C. for 22 hours, showed signs of slow reaction. Viscosity was 6,125 cP at 190° C. After total heating time at 190° C. of 44 hours viscosity was 21,200 cP, acid number was 3.2, and infrared showed bands at 1,782 and 1,850 cm$^{-1}$ indicative of anhydride functionality.

The results show that a copolymer in which the acid component is incorporated into the backbone of the polymer chain reacts much slower than a copolymer in which the acid component is grafted onto the polymer chain (see Example 2).

We claim:

1. A cross-linkable hot-melt adhesive comprising:
   (a) about 50 to 99% by weight, based on the total composition of at least one acid graft modified propylene/higher olefin copolymer containing about 70 to 95 mole percent propylene;
   (b) up to 50% by weight of at least one tackifying resin;
   (c) about 1 to 20 parts by weight per 100 parts by weight of (a) an epoxy cross-linking agent of the formula;

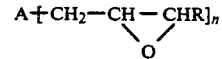

in which n is between 2 and 6 inclusive, A is a polyfunctional group of the valency n, and R is hydrogen or a hydrocarbon radical;
   (d) about 0.05 to 10% by weight of at least one antioxidant; and
   (e) about 0.1 to about 10% by weight based on (c) plus (e) of a tertiary amine catalyst.

2. The cross-linkable hot-melt adhesive according to claim 1 wherein the olefin in said copolymer is from an alpha olefin of 4 to 10 carbon atoms.

3. The cross-linkable hot-melt adhesive according to claim 2 wherein the copolymer is a maleated amorphous propylene/hexene copolymer.

4. The cross-linkable hot-melt adhesive according to claim 1 wherein said acid graft modified propylene/olefin copolymer has an acid number of about 5 to 20 and a melt viscosity of about 1,000 to 2,000 cP at 177° C.

5. The cross-linkable hot-melt adhesive according to claim 1 wherein the acid graft modified propylene/olefin copolymer is selected from low molecular weight propylene/olefin copolymers and degraded propylene-/olefin copolymers and is present in an amount between about 55 and 65%.

6. The cross-linkable hot-melt adhesive according to claim 1 wherein the tackifying resin is present in an amount between about 20 and 35% by weight of the total adhesive composition, is selected from the group consisting of hydrocarbon resins, terpene resins, and rosin esters, and has a ring and ball softening point of about 95° C. to 135° C.

7. The cross-linkable hot-melt adhesive according to claim 6 wherein said tackifying resin is a hydrocarbon resin having a ring and ball softening point of about 125° to 130° C., an acid number of about 0 to 2, an acid value of less than about 1, and an iodine value of about 75 to 100.

8. The cross-linkable hot-melt adhesive according to claim 6 wherein said tackifying resin is a terpene resin comprising a mixture of sulphate terpene, and at least 20% of at least one other terpene selected from the group consisting of pinene, limonene, and dipentene.

9. The cross-linkable hot-melt adhesive according to claim 1 wherein the amount of epoxy is such that the equivalent ratio, $$\frac{\text{Epoxide equivalents in the Polyepoxide}}{\text{Anhydride equivalents in the Polymer}}$$

is between about 0.1 and 1 and the epoxy is Bisphenol-A diglycidyl ether.

10. A cross-linkable hot-melt adhesive comprising:
(a) about 50 to 99% by weight, based on the total composition of at least one acid graft modified propylene/olefin copolymer containing about 70 to 95 mole percent propylene;
(b) up to 50% by weight of at least one tacktifying resin;
(c) about 1 to 20 parts by weight per 100 parts by weight of (a) of an epoxy cross-linking agent of the formula;

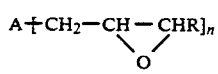

in which n is between 2 and 6 inclusive, A is a polyfunctional group of the valency n, and R is hydrogen or a hydrocarbon radical;

(d) about 0.05 to 10% by weight of at least one antioxidant; and
(e) about 0.1 to about 10% by weight based on (c) plus (e) of a latent tertiary amine catalyst of the formula R'₃NX wherein R' is a hydrocarbon radical having from 1 to 30 carbon atoms, and X is thermally labile in combination with R'₃N.

11. A process for producing a hot-melt adhesive comprising:
(1) mixing a propylene/olefin copolymer with an unsaturated carboxylic acid, anhydride, or monoester thereof under conditions of temperature and pressure to graft the acid, anhydride, or monoester onto said propylene/olefin copolymer;
(2) mixing the resulting acid graft modified propylene/olefin copolymer with
(a) about 1 to 20 parts by weight per 100 parts by weight of said copolymer of an epoxy cross-linking agent of the formula

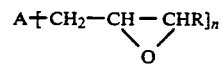

in which n is between 2 and 6 inclusive, a is a polyfunctional group of the valency of n, and R is a hydrocarbon radical or hydrogen;
(b) up to 50% by weight of at least one tackifying resin,
(c) about .05 to 10% by weight of at least one antioxidant; and
(d) about 0.1 to about 10% by weight based on (a) plus (d) of a tertiary amine catalyst;
(3) heating this mixture to a sufficient temperature for a sufficient time to substantially cross-link the acid graft modified propylene/olefin copolymer with the epoxy.

12. The process according to claim 11 wherein Step 3 is carried out at a temperature of at least 150° C. for at least 5 minutes.

13. The process according to claim 11 wherein Step 3 is at least partially carried out in a heated stirred pot of a hot-melt applicator followed by applying the hot-melt adhesive to a substrate.

14. An article of manufacture comprising the hot-melt adhesive and substrate of claim 13.

15. The cross-linkable hot-melt adhesive according to claim 10 wherein said latent tertiary amine catalyst is n-methyl morpholine picrate.

* * * * *